United States Patent Office 3,349,005
Patented Oct. 24, 1967

3,349,005
FERMENTATION PROCESS FOR PRODUCTION
OF CITRIC ACID
Mario Alexander Batti, Elkhart, Ind., assignor to Miles
Laboratories, Inc., Elkhart, Ind., a corporation of
Indiana
No Drawing. Filed May 25, 1965, Ser. No. 458,747
4 Claims. (Cl. 195—36)

ABSTRACT OF THE DISCLOSURE

The undesirable effects of contaminants, such as iron, in a citric acid-producing fermentation medium are counteracted by the addition of inhibitors, such as copper and organic materials. If an excess amount of inhibitor is present, the production of citric acid is retarded. This can be overcome by adding an alkaline material to the medium to increase the pH to a valve of at least about 3.0.

This invention relates to a process for the fermentation production of citric acid. More particularly, it relates to a process for obtaining desirable yields of citric acid when the fermentation medium contains excessive amounts of inhibitor materials.

It is known in the art that citric acid can be produced in commercial quantities by the fermentation of carbohydrate materials using various strains of citric acid-producing fungi. Certain strains of *Aspergillus niger* have proved to be particularly useful for this purpose. In addition, various strains of other species of fungi, such as *Aspergillus clavatus, Aspergillus wentii, Aspergillus luchuensis, Penicillium citrinum, Penicillium luteum* and the like, have been used with varying degrees of success.

One form of fermentation process employed in the art for citric acid production involves a submerged fermentation wherein the carbohydrate substrate, the citric acid producing fungal strain and nutrients necessary for fungal metabolism are contained within a vertical tank and air is passed through the tank contents. This air stream provides the oxygen-containing atmosphere necessary for fungal metabolism and also provides a means for agitating and mixing the fermentor tank contents.

It is also known in the art that certain contaminating materials, such as iron compounds, can interfere with the citric acid-producing fermentation and reduce the overall yield of citric acid as well as cause the production of undesirable by-products. The harmful effects of the iron compounds and other contaminants have been overcome in the prior art through use of inhibitor materials, such as copper and organic materials, such as cresylic acid, xylenol, cresol and the like. These inhibitor materials, while actually toxic to the citric acid-producing fungi, can be employed in minor amounts to decrease the sensitivity of the fungi to the harmful effects of the iron compounds and other contaminants. If amounts of the inhibitor materials are employed in excess of that required to compensate for the specific level of iron contamination, for example, such excess inhibitor can cause a reduction in citric acid production. This excess amount can result due to an error in measurement of the quantity added, an error in measurement of the contamination level or lack of advance information as to the specific activity of the organism employed in a specific fermentation medium. If an over-inhibited medium resulted in the prior art from the addition of excess inhibitor, there was nothing that could be done to "reactivate" the organism and obtain desirable yields of citric acid within acceptable fermentation times.

It is an object of the present invention to provide a process for overcoming the undesirable effects caused by the presence of an excess amount of inhibitor in a citric acid-producing fermentation medium.

It is a further object to provide such a process which is convenient and easy to perform.

In accordance with the present invention, a process is provided which comprises adding to a fermentation medium suitable for producing citric acid and which contains an excess amount of inhibitors which tend to suppress growth of the fermenting organism an alkaline material to increase the pH of said medium to a value of at least about 3.0, thereby promoting the citric acid-producing activity in said medium. More particularly, the process comprises adding to a citric acid-producing fermentation medium in which citric acid has begun to form and which contains an excess amount of inhibitors which tend to suppress growth of the fermenting organism an alkaline material to increase the pH of said medium to a value in the range of from about 3.0 to about 5.0, thereby promoting the citric acid-producing activity in said medium.

Any alkaline material which does not introduce harmful cations to the medium can be employed in the present process to increase the fermentation medium pH. Exemplary materials are ammonia, ammonium hydroxide, ammonium carbonate, ammonium carbamate, barium hydroxide, calcium hydroxide, lithium hydroxide, sodium hydroxide, potassium hydroxide and the like. Ammonium hydroxide is the preferred alkaline material used in the present invention.

It should be noted that the process of the present invention is clearly distinguished from the prior art process of periodically adding ammonium hydroxide to a citric acid fermentation medium as a supplementary source of nitrogen nutrients. Such prior art process employed the nitrogen-containing material in quantities such that the fermentation medium pH remained less than 3.0. In the present process the alkaline material, such as ammonium hydroxide, is added in quantities such as to achieve a fermentation medium pH of at least about 3.0 and preferably from about 3.0 to about 5.0. Furthermore, the present process is only employed when the citric acid-producing activity of the fermentation medium is retarded by the presence of an excess amount of inhibitors, such as copper. In such case, the routine addition of a small amount of ammonium hydroxide to supply supplemental nutrient nitrogen according to prior art teaching would not affect the retarded citric acid-producing activity.

The above described increase in fermentation medium pH to a value of at least about 3.0 is generally achieved by adding an appropriate amount of alkaline material as soon as it is apparent that the citric acid-producing activity is being retarded. Such retarded activity can be detected by periodic sampling of the fermentation medium for citric acid content or by the observation that the mycelium being formed is of a type which is not conducive to citric acid formation. Such observations are readily understood by those skilled in the art. It should be noted, however, that there is no intention in the present invention to continuously maintain the fermentation medium pH above 3.0. Raising the pH to at least about 3.0 is useful to reactivate the fermentation, but if the pH is maintained above 3.0 for a substantial period of time, the organism will tend to form undesirable amounts of contaminating oxalic acid. Once the citric acid-producing activity resumes, the pH of the fermentation medium will begin to drop, generally to a value below about 2.0. If the pH reaches a value over about 5.0, the fungal metabolism at this pH level tends to form fungal mycelial structures having reduced citric acid-producing activity.

The general process conditions for carrying out the citric acid fermentation are described, for example, in U.S. Patent Nos. 2,476,159 of L. B. Schweiger et al.;

2,492,667 of R. L. Snell et al.; 2,492,673 of J. C. Woodward et al.; 2,916,420 of L. B. Schweiger; 2,970,084 of L. B. Schweiger and 3,083,144 of M. W. Shepard. Such general process conditions are followed in carrying out the present invention which relates principally to an adjustment in the pH of a fermentation medium which contains an excess amount of inhibitors which suppress growth of the fermenting organism. Such improvement enables satisfactory citric acid yields to be obtained in a substantially shorter period of time than are required by prior art processes wherein the pH of the fermentation medium containing excess inhibitors was not adjusted.

The carbohydrate materials useful as the fermentation substrate for citric acid production according to the present invention can be any of the sugar-containing materials known to the art. Such materials are exemplified by sugar syrups obtained from natural sources, such as cane syrup, and sugar-containing materials obtained by hydrolysis of starch, such as corn starch. The hydrolysis of starch to form sugar can be catalyzed by the well known use of hydrochloric acid or enzymes, such as amyloglucosidase.

The invention will be further described in the following examples:

Example 1

An 8000-gallon quantity of high test cane sugar syrup was decationized by well known procedures and then nutrients were added to the decationized liquid in the amount of 50 p.p.m. (parts per million by weight) $Ca^{++}$ ions as $CaCl_2 \cdot 2H_2O$, 0.015 weight percent $KH_2PO_4$, 0.10 weight percent $MgSO_4 \cdot 7H_2O$ and sufficient $NH_4OH$ to adjust the pH to 2.82. A portion of this mixture was then autoclaved for 10 minutes at 240–245° F. (115–119° C.) and 16–18 p.s.i.g. to sterilize it. This sterilized fermentation substrate and nutrient mixture was then cooled to room temperature (about 20–25° C.). A 4-liter quantity was charged to a vertical aerated fermentor. This fermentor consisted of a vertical glass pipe 4 inches O.D. and 48 inches long. The ends of the pipe were sealed with stainless steel end plates provided with air inlet and outlet passages. A glass sparger was attached to the air inlet line near the bottom of the glass pipe to provide desired air distribution throughout the fermentor contents. To the 4-liter fermentor contents containing 760 grams of sugar and also having an iron content maximum of about 0.3 p.p.m. were added 0.3 p.p.m. $Cu^{++}$ ions as $CuSO_4 \cdot 5H_2O$ and 0.3 p.p.m. $Zn^{++}$ ions as $ZnSO_4 \cdot 7H_2O$. These salts were sterilized in an autoclave before addition to the fermentor. Aeration was started at 6 liters of air per minute. The fermentor contents were then inoculated with an aqueous suspension of *Aspergillus niger* spores. The fermentor was then heated to 30–33° C. and the aeration continued at the above rate for 24 hours. The aeration was then increased to 7 liters per minute. During the first 72 hours of fermentation the mycelium formed was undesirably stunted indicating low citric acid-producing capacity. This was also shown by low rates of actual citric acid production during this time. After 72 hours of fermentation, sufficient $NH_4OH$ was added to raise the pH of the fermentation medium to 3.7. Within 21 hours the rate of citric acid production significantly increased. Supplemental nitrogen nutrient was added in amounts of 7.5 ml. of conc. $NH_4OH$ after 137 hours and 215 hours. Such additions had minor effects on changing overall pH of the fermentation medium. The fermentation was continued for a total of 10 days and 21 hours and then terminated. The overall yield was 494 grams of citric acid. In this run the 0.3 p.p.m. $Cu^{++}$ inhibitor content of the fermentation medium was excessive in view of the iron content level of about 0.3 p.p.m. or less. The pH adjustment during fermentation to at least 3.0 reactivated the fermentation system with respect to its citric acid-producing capacity.

Example 2

The above procedure was repeated with the exception that the alkaline addition to a level of pH 3.7 was eliminated. The overall yield of citric acid was only 361 grams and represented the state of the prior art for over-inhibited citric acid systems.

Example 3

A 110-liter quantity of refined cane sugar solution containing 19.4 weight percent sugar solids was acidulated to pH 1.60 with 100 ml. of sulfuric acid. The acidified solution was then heated to 49° C. and passed at a rate of 200–225 ml./min. through a 0.1 cu. ft. bed of Nalcite HGR cationic ion-exchange material. This is a strongly acid cation exchange resin marketed by the National Aluminate Co. A 109-liter quantity of decationized effluent was collected in the range of pH 1.58 to 1.54. Nutrients were added to this effluent in an amount of 25 p.p.m. $Ca^{++}$ ions as $CaCl_2 \cdot 2H_2O$; 0.014 weight percent $KH_2PO_4$; 0.1 weight percent $MgSO_4 \cdot 7H_2O$ and 240 ml. of conc. $NH_4OH$. The pH was adjusted to 3.3 by adding 1 ml. conc. sulfuric acid. This mixture was then autoclaved for 10 minutes at 121° C. and 16–18 p.s.i.g. to sterilize it. This sterilized liquid was then cooled to room temperature (about 20–25° C.). Four-liter portions of the above-prepared solution were placed into each of two separate vertical aerated fermentors. To the contents of each fermentor were added 5 p.p.m. $Cu^{++}$ ions as $CuSO_4 \cdot 5H_2O$ and 5 p.p.m. $Zn^{++}$ ions as $ZnSO_4 \cdot 7H_2O$ which had been previously sterilized. This amount of copper was in excess of the amount required to suppress the specific iron contamination of the fermentation medium. Aeration was started at 6 liters of air per minute. The fermentor contents were then inoculated with an aqueous suspension of *Aspergillus niger* spores. The fermentors were heated to 30–33° C. and the aeration continued at the above rate for 24 hours. The aeration was then increased to 7 liters per minute. In one fermentor (Fermentor A) the fermentation was allowed to continue for 10 days and 17 hours with only the addition of supplemental nitrogen nutrient in the amount of 3.3 ml. conc. $NH_4OH$ after 113 hours. This had negligible effect on pH of the medium. The overall yield of citric acid was 485 grams. The citric acid production rate was also low indicating excess copper inhibiting agent. In the other fermentor (Fermentor B) conc. $NH_4OH$ was added to increase the pH from 2.42 to a level of 4.0 after 22 hours of fermentation. The citric acid production rate quickly increased. Supplemental nitrogen nutrient in the form of 3.3 ml. of conc. $NH_4OH$ was added after 113 hours and 209 hours. Such additions had negligible effect on pH of the medium. The overall yield of citric acid during the 10 days and 17 hours was 561 grams. The citric acid production data for the two fermentors are listed below corresponding to given hours of fermentation.

| Hours | Fermentor A (no pH adjustment) Cumulative Citric Acid Produced (grams) | Fermentor B (pH adjustment) Cumulative Citric Acid Produced (grams) |
|---|---|---|
| 22 |  | (¹) |
| 41 | 20 | 24 |
| 63 | 26 | 70 |
| 89 | 41 | 171 |
| 113 | ² 108 | ² 264 |
| 161 | 249 | 429 |
| 185 | 333 | 504 |
| 209 | 382 | ² 536 |
| 235 | 463 | 556 |
| 257 | 485 | 561 |

¹ pH adjusted to 4.0.
² Supp. N added.

It can clearly be seen from the above data that the adjustment of pH to a level above 3.0 by addition of alkaline material to an over-inhibited fermentation medium can significantly increase citric acid production rate and overall citric acid production. Fermentor B was able to achieve an overall higher yield than Fermentor A and a given yield of citric acid in a substantially shorter period of time than Fermentor A. This can result in operating economies for a commercial plant.

In summary, this invention relates to a process improvement for increasing the citric acid-producing activity of a fermentation medium which contains an excess amount of inhibitors. The improvement comprises adding an alkaline material, preferably ammonium hydroxide, to the fermentation medium so as to increase the fermentation medium pH to a level in the range of from about 3.0 to about 5.0 and then resuming normal fermentation procedures. This improved process enables higher citric acid yields to be obtained and desired citric acid yields to be obtained in a shorter time as compared to prior art processes having over-inhibited fermentation media.

What is claimed is:

1. In a process for producing citric acid in a citric acid-producing medium in which citric acid has begun to form resulting in a pH of less than about 3.0 and wherein the rate of citric acid production in said medium is retarded by the presence in said medium of an excess amount of an inhibitor selected from the class consisting of copper and organic materials which are toxic to citric acid-producing fungi, said inhibitor intended to counteract the undesirable presence of contaminants in said medium, the improvement which comprises adding to said fermentation medium an amount of alkaline material sufficient to increase the pH of said medium to a value of at least about 3.0 to counteract the retarding effect of said excess amount of inhibitor and promote the citric acid-producing activity in said medium.

2. A process according to claim 1 wherein the alkaline material is added to increase the pH of the fermentation medium to a level of from about 3.0 to about 5.0.

3. A process according to claim 1 wherein the inhibitor is copper.

4. A process according to claim 1 wherein the added alkaline material is ammonium hydroxide.

References Cited
UNITED STATES PATENTS

| | | | |
|---|---|---|---|
| 3,189,527 | 6/1965 | Lockwood et al. | 195—36 |
| 3,290,227 | 12/1966 | Batti | 195—36 |

A. LOUIS MONACELL, *Primary Examiner.*

LIONEL M. SHAPIRO, *Examiner.*